Dec. 10, 1957 F. T. VANDER POEL 2,815,795
HONEYCOMB CORE MATERIAL AND METHOD OF FABRICATING THE SAME
Filed Feb. 16, 1955
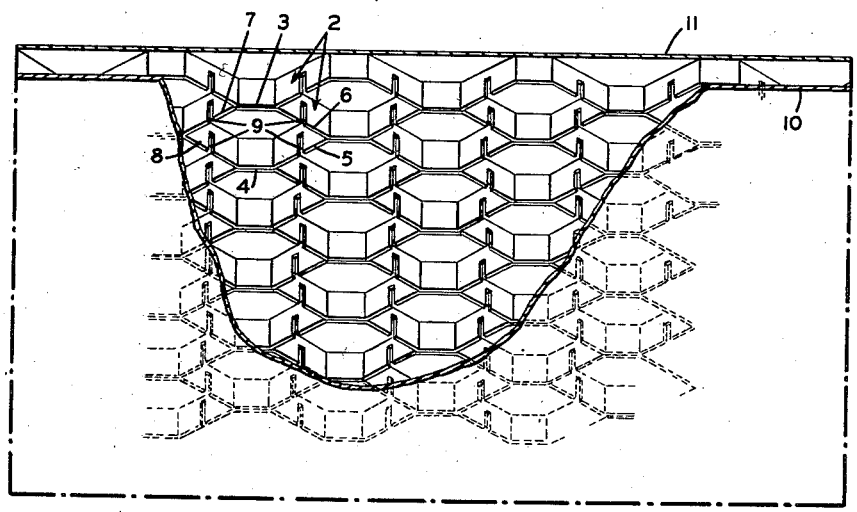
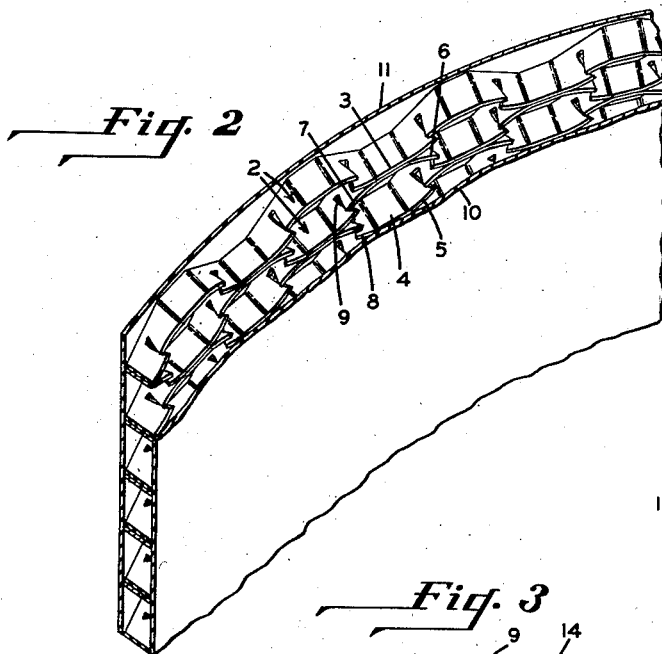
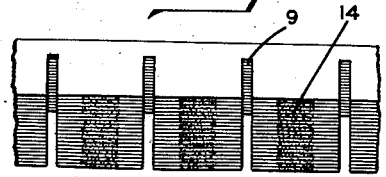
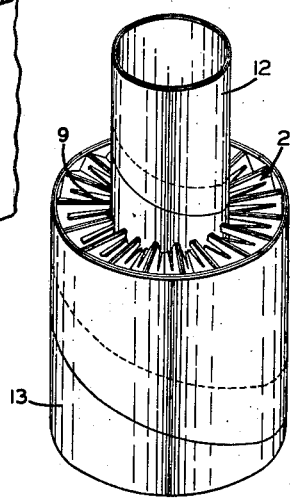
INVENTOR
FREDERICK T. VANDERPOEL
ATTORNEY

United States Patent Office 2,815,795
Patented Dec. 10, 1957

2,815,795

HONEYCOMB CORE MATERIAL AND METHOD OF FABRICATING THE SAME

Frederick T. Vander Poel, Manor Township, Lancaster County, Pa., assignor to Armstrong Cork Company, Lancaster, Pa., a corporation of Pennsylvania Application February 16, 1955, Serial No. 488,574

5 Claims. (Cl. 154—28)

This invention relates to a so-called honeycomb core material and the fabrication thereof and is concerned more particularly with a core material which may be conformed to curved surfaces, as in the fabrication of cylindrical structural units. It also relates to structural units including the new core material as a component thereof.

Honeycomb core material, as conventionally produced, is made up of strips of paper, metal foil, impregnated fabric, or the like, each bonded to adjacent strips in spaced areas so that when the material is expanded a body made up of hexagonal cells is formed, two of the cell walls being connected to adjacent cell walls, as in a honeycomb. This type of core material is well known and needs no further description.

It is known that this conventional honeycomb core material is capable of being deformed about an axis which is generally parallel to the adhesively bonded cell walls but is incapable of any substantial deformation in a direction at right angles thereto. Thus, the material is incapable of being wrapped around a cylindrical forming surface as a helix on a paper tube forming machine, for example.

An object of the present invention is to provide a honeycomb type core material which is capable of deformation about an axis generally at right angles to the adhesively bonded cell walls and may thus be fabricated into curved structures even though the core material may be required to assume a compound curvature in formation.

Another object of the invention is to provide a method of forming a conformable cellular core material which will be easy to practice with conventional equipment.

A further object of the invention is to provide a method of fabricating curved structural members comprising a cellular core and facing and backing sheets.

An additional object of the invention is to provide a structural unit of cylindrical configuration having a honeycomb core.

Other objects of the invention will be obvious from consideration of the detailed description of the invention which follows.

The cellular core material of the invention comprises a plurality of strips of material, such as paper, adhesively joined together at spaced areas to form hexagonal cells, two walls of each of which are joined to neighboring cell walls. Slits are provided in each of the four remaining walls of the cells. The slits extend through a substantial portion of the depth of the strips and permit conformation of the core material to curved forming surfaces.

In the fabrication of this new core material, a plurality of strips are adhesively joined together at spaced areas to form hexagonal cells when the strips are expanded; the strips are held in compacted, unexpanded condition with the adhesive areas in alignment, and slits which extend through a substantial portion of the depth of the strips are formed intermediate the adhesively joined areas.

Curved structural members may be formed by the method of this invention by positioning a backing layer on a curved surface and conforming it thereto. A strip of cellular core material made up of a plurality of strips of sheet material adhesively joined together at spaced areas to form hexagonal cells and with slits in the unjoined cell walls is bent over said backing sheet with an adhesive layer interposed between the backing sheet and the core material. A facing sheet is disposed over the core material with an adhesive layer interposed between the facing sheet and the core material. The assembly is held in curved position until the adhesive layers have set. A curved structural member such as a cylindrical unit or column may be produced by this method, with the core material and the backing and facing sheets being helically wrapped over a cylindrical forming surface.

Referring to the accompanying drawings:

Figure 1 is a perspective view, partially broken away, illustrating the core material of this invention disposed as a flat unit;

Figure 2 is a perspective view, also partially broken away, illustrating the core material of the invention deformed about an axis generally at right angles to the adhesively joined areas of the strips forming the core;

Figure 3 is a perspective view illustrating the method of fabricating the core material; and Figure 4 is a diagrammatic view illustrating a cylindrical unit formed with honeycomb core material.

Referring to Figure 1, the core material is made up of a plurality of strips 2 of paper, metal foil, impregnated fabric, or other sheet material. The adjacent strips are joined together at spaced areas 3 and 4 which constitute two walls of the hexagonal cells when the material is expanded as illustrated in Figure 1. The four remaining walls 5, 6, 7, and 8 are unattached. Each of these unattached walls is provided with a slit 9 which extends from the base of the strips 2 through a substantial portion of the depth thereof. In Figure 1, these slits are shown as extending through about three-fourths of the depth of the strips. The depth of the slits will vary depending upon the type of sheet material used in the core, the size of the cells, the width of the strips used in forming the core material, and other variable factors.

A backing sheet 10 which may be of paper, metal foil, plywood, plastic laminate, or other sheet material is preferably united to the core material; and a facing sheet 11 of similar material is preferably united to the opposite side of the core material. The structure has been shown in flat condition in Figure 1 to illustrate the positioning of the cell walls and slits, but the important advantages of the invention will be achieved when the core unit is curved as shown in Figure 2. In this view, numbers the same as used in Figure 1 have been applied to the corresponding parts.

In one method of fabricating a curved unit, such as shown in Figure 2, backing layer 10 will be disposed on a curved forming surface, a layer of adhesive will be applied by a roll to the side of the core material having the slits therein, or it may be spread on the surface of the backing layer 10 remote from the curved forming surface over which the backing layer 10 is disposed. The body of expanded core material, as shown in Figure 2, will be pressed into engagement with the backing layer, with the adhesive layer interposed therebetween. It is preferred to have the slits extend to the concave surface of the unit, as shown in Figure 2. The core material may be bent and the cell walls distorted to cause the material to conform to the curved surface, even though the curve may be a compound one or may have its axis of curvature essentially at right angles to the adhesively joined walls 3 and 4, as in the curved section shown in Figure 2. It will be noted that, in the bending of the core material, distortion of the cell walls occurs at the slits 9, permitting deformation of the core to a curved surface having a relatively small radius of curvature.

In making a column of cylindrical shape as diagrammatically shown in Figure 4, the following procedure may be followed. The core material may have the following specifications:

Paper strip honeycomb core with cell walls 1" deep, glue strip 3/8" wide, cell size 1" nominal when expanded, slits 1/16" wide and 3/4" deep, cut on 1" centers (between glue strips).

Core width before expansion 6" and length indefinite, the core being expandable in a longitudinal direction.

A multi-ply backing layer 12 made up of metal foil sheets 5½" wide and .0035" thick may be wrapped helically over a 4½" diameter forming mandrel generally in the manner of forming a paper tube, i. e. with two strips helically wrapped and adhesively bonded together, with the joints broken. A strip of the above described core material made in accordance with this invention may be wrapped helically over this multi-ply backing layer on the mandrel with an adhesive interposed between the backing layer and the core material. The core material is wrapped with its longitudinal edges in abutting relationship. A multi-ply facing layer 13 of metal foil similar to the backing layer may then be wrapped over the core material with an adhesive interposed therebetween. When the adhesive layers have set sufficiently, the material may be removed from the forming mandrel.

Figure 3 illustrates one method of forming the core material. The strips which constitute the core are collapsed and compressed into a tight mass, with the adhesive areas 14 in alignment. Intermediate these areas, slits 9 are formed by use of a circular table saw, for instance, the blades of which are set to cut slits of the desired depth. The slitting operation, whether performed with a single saw or a gang saw, or with slitting knives or other slitting device, is repeated until the entire unit of core material has been provided with slits intermediate the glued areas. This provides a very simple and effective method of core formation and results in a core material which may be conformed to curved surfaces as discussed above.

I claim:

1. A curved structural member comprising a cellular core formed of a plurality of strips adhesively joined together at spaced areas to form hexagonal cells, two walls of each of which are joined to neighboring cell walls, said strips being provided with slits extending through a substantial portion of the depth thereof in each of the four remaining unjoined cell walls, said cellular core material being curved with the slits entering into the concave face of the core and the cell walls being distorted, and facing and backing members adhesively bonded to the edges of said core strips closing the cells and holding said core in curved condition.

2. A curved structural member in accordance with claim 1 in which the cellular core is formed of a plurality of paper strips and in which said facing and backing members are formed of metal.

3. A hollow cylindrical structural member comprising a helically disposed backing layer, a cellular core formed of a plurality of strips adhesively joined together at spaced areas to form hexagonal cells, two walls of each of which are joined to neighboring cell walls, said strips being provided with slits extending through a substantial portion of the depth thereof in each of the four remaining unjoined cell walls, said cellular core being curved and helically disposed over said backing layer with the slits entering into the concave face of the core toward said backing layer and the cell walls being distorted, and a facing layer helically disposed over said cellular core, and adhesive joining said facing and backing layers to said core, closing the cells and holding said core in curved condition.

4. In a method of forming a curved structural member, the steps comprising disposing a backing layer over a curved forming surface, bending over said backing sheet a length of cellular core material comprising a plurality of strips adhesively joined together at spaced areas to form hexagonal cells, two walls of each of which are joined to neighboring cell walls, said strips being provided with slits extending through a substantial portion of the depth thereof in each of the four remaining unjoined cell walls, said slits entering into the concave face of the core material and the cell walls being distorted, interposing an adhesive between the backing layer and the core material, and disposing a facing layer over said core material with an adhesive interposed between the facing layer and the core material, and bonding the edges of said core strips to said backing and facing layers to hold said core material in curved condition.

5. In a method of forming a cylindrical structural member, the steps comprising helically disposing a backing layer over a cylindrical forming surface, helically wrapping over said backing layer a length of cellular core material comprising a plurality of strips adhesively joined together at spaced areas to form hexagonal cells, two walls of each of which are joined to neighboring cell walls, said strips being provided with slits extending through a substantial portion of the depth thereof in each of the four remaining unjoined cell walls with the slits entering into the concave face of the core material toward said backing and the cell walls being distorted, interposing an adhesive between the backing layer and the core material, helically disposing a facing layer over said core material with an adhesive interposed between the facing layer and the core material, bonding the facing and backing layers to the edges of said core strips to hold said core material in curved condition, and removing the assembly from the forming surface.

References Cited in the file of this patent

UNITED STATES PATENTS

| Number | Name | Date |
| --- | --- | --- |
| 1,942,989 | Thomson | Jan. 9, 1934 |
| 2,322,204 | Ballard | June 22, 1943 |
| 2,537,026 | Brugger | Jan. 9, 1951 |
| 2,609,068 | Pajak | Sept. 2, 1952 |
| 2,654,686 | Hansen | Oct. 6, 1953 |
| 2,728,479 | Wheeler | Dec. 27, 1955 |
| 2,733,176 | Balis | Jan. 31, 1956 |

FOREIGN PATENTS

| Number | Country | Date |
| --- | --- | --- |
| 377,135 | Great Britain | July 21, 1932 |